US012809958B2

(12) United States Patent
Samardzija et al.

(10) Patent No.: US 12,809,958 B2
(45) Date of Patent: Nov. 24, 2026

(54) COMPUTERIZED SYSTEMS AND METHODS FOR BIOMETRIC AUTHENTICATION VIA A DEVICE

(71) Applicant: PLUME DESIGN, INC., Palo Alto, CA (US)

(72) Inventors: Miroslav Samardzija, Mountain View, CA (US); Gal Trapečar, Ljubljana (SI); Grigor Ristov, Ljubljana (SI); Dariusz Kopka, Warsaw (PL); Liem Hieu Dinh Vo, San Jose, CA (US)

(73) Assignee: PLUME DESIGN, INC., Palo Alto, CA (US)

(*) Notice: Subject to any disclaimer, the term of this patent is extended or adjusted under 35 U.S.C. 154(b) by 186 days.

(21) Appl. No.: 18/354,752

(22) Filed: Jul. 19, 2023

(65) Prior Publication Data

US 2025/0028801 A1 Jan. 23, 2025

(51) Int. Cl.
*G06F 21/32* (2013.01)
*G06F 21/34* (2013.01)

(52) U.S. Cl.
CPC .............. *G06F 21/32* (2013.01); *G06F 21/34* (2013.01)

(58) Field of Classification Search
CPC ................................. G06F 21/32; G06F 21/34
USPC .......................................................... 713/185
See application file for complete search history.

(56) References Cited

U.S. PATENT DOCUMENTS 10,133,857 B2 * 11/2018 Arunachalam ..... H04L 63/0861
10,762,366 B2 * 9/2020 Che .................... G06V 10/7515
10,776,469 B2 * 9/2020 Venkatesan ............ H04N 23/60
2004/0165725 A1 * 8/2004 Kumar ..................... G06F 21/73 348/E5.007
2010/0067757 A1 * 3/2010 Arai ................... G06V 40/1318 382/128
2011/0304720 A1 * 12/2011 Kumar ............... G06V 40/1359 382/116
2012/0075173 A1 * 3/2012 Ashbrook ............. G06F 3/0362 345/156

(Continued)

FOREIGN PATENT DOCUMENTS

CN 113837069 A * 12/2021 ............. G06F 21/32
WO WO-2017089646 A1 * 6/2017 ........... G06F 21/602
WO WO-2021103955 A1 * 6/2021 ............ H04M 3/465

OTHER PUBLICATIONS

English translation of WO-2021103955-A1, pp. 1-44 (Year: 2021).*

(Continued)

*Primary Examiner* — David P Zarka
(74) *Attorney, Agent, or Firm* — Nicholas Martin; Greenberg Traurig, LLP

(57) ABSTRACT

Systems and methods disclosed herein provide a framework for user authentication and verification via a user's wearable device. In some embodiments, information, inclusive of data, metadata, metrics and/or models of a user's vein structure in their hand/finger can be leveraged to determine whether a user is to be granted access to securely held resources, inclusive of real-world, digital and/or electronic assets. The disclosed framework can operate to cause a wearable device of a user to check whether vein/vital information of a user corresponds to learned/known vein model data of the user, whereby an access request can be enabled via communication via the wearable upon performing such determination.

12 Claims, 8 Drawing Sheets

(56) References Cited

U.S. PATENT DOCUMENTS

| | | | | |
|---|---|---|---|---|
| 2015/0310444 | A1* | 10/2015 | Chen | G06Q 20/308<br>705/44 |
| 2016/0034742 | A1* | 2/2016 | Kim | G06F 21/35<br>382/124 |
| 2016/0072802 | A1* | 3/2016 | Hoyos | G06F 16/9535<br>726/5 |
| 2016/0171201 | A1 | 6/2016 | Schröder | |
| 2017/0108939 | A1* | 4/2017 | Chilmulwar | G08C 17/02 |
| 2017/0161577 | A1* | 6/2017 | Lee | A61B 5/6897 |
| 2019/0125221 | A1* | 5/2019 | Kobayashi | G06T 1/0007 |
| 2019/0155385 | A1* | 5/2019 | Lim | G06F 3/033 |
| 2019/0258881 | A1* | 8/2019 | Shin | G06F 21/32 |
| 2020/0311370 | A1* | 10/2020 | Hu | G06V 40/10 |
| 2020/0391696 | A1* | 12/2020 | Kato | B60R 25/241 |
| 2023/0155914 | A1* | 5/2023 | Wang | H04L 43/12 |
| 2023/0247133 | A1* | 8/2023 | Ni | G06F 21/32<br>379/93.03 |
| 2024/0067288 | A1* | 2/2024 | Jin | G08B 13/19613 |
| 2024/0236085 | A1* | 7/2024 | Shibuichi | H04L 63/0861 |

OTHER PUBLICATIONS

Google Translate, CN-113837069-A, pp. 1-14, 2021 (Year: 2021).*
International Search Report and Written Opinion to corresponding Int'l Appln. No. PCT/US24/37978, mailed Oct. 11, 2024, 9 pages.

* cited by examiner

COMPUTERIZED SYSTEMS AND METHODS FOR BIOMETRIC AUTHENTICATION VIA A DEVICE

FIELD OF THE DISCLOSURE

The present disclosure is generally related to a biometric identification system, and more particularly, to a biometric identification system that uses a smart wearable device to leverage learned vein patterns of a user to authenticate the user.

BACKGROUND

There is growing number of smart wearable devices (or smart wearables or wearables, used interchangeably), such as rings, wristbands, watches, on the market. Typically, these wearables connect to smart phone, upon which a user can be authenticated. However, as in conventional mechanisms, it is only through the phone that user can claim the wearable device and prove ownership. Users are currently required to use a passcode, swipe pattern, and/or face recognition, to "unlock" the smart wearable device.

SUMMARY OF THE DISCLOSURE

Authentication of a user on and/or via their wearable device is crucial to providing them a secure operational environment. For example, when leveraged in a secure manner, a smart ring can be used for wireless payments transferring personal data at a pharmacy/hospital, transferring personal data/authentications upon entering trains, busses, buildings, and the like, and/or any other type of known or to be known mechanism or reasoning for which personal data and/or account information can be utilized. However, conventional mechanisms for providing such required security falls short of a "closed loop" framework that securely and efficiently manages user computing sessions.

Thus, according to some embodiments, as discussed herein, the disclosed systems and methods provide a novel computerized framework that addresses such shortcomings, among others, by providing a wearable device (e.g., a smart ring) that is configured to provide user authentication through vein pattern recognition. Accordingly, as discussed herein, the disclosed wearable device and the corresponding frameworks' functionality described herein, eliminates the need for the various authentication devices by providing non-native functionality that enables access mechanisms to be stored within and/or in association with the wearable device. In some embodiments, upon confirmation that the user is properly wearing a smart ring, for example, the disclosed framework can operate to automatically confirm the user's identity, whereby secure real-world and/or digital activities can be permitted.

According to some embodiments, a method is disclosed for a biometric identification system that uses a smart wearable device to leverage learned vein patterns of a user to authenticate the user. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for biometric identification system that uses a smart wearable device to leverage learned vein patterns of a user to authenticate the user.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
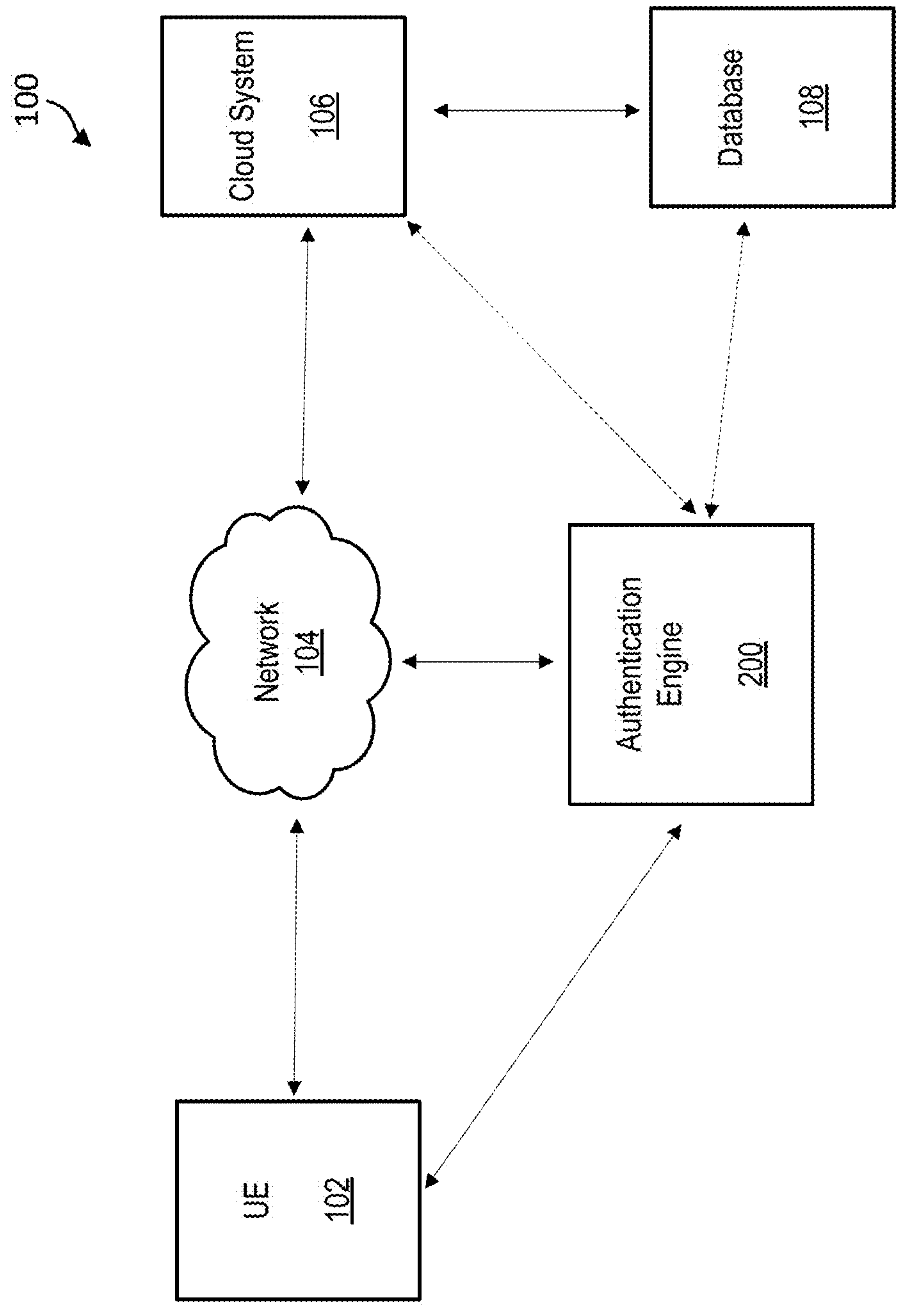
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, some embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "some embodiments" as used herein does not necessarily refer to the same embodiment that the limitation is being described in association with, and the phrase "some embodiment" as used herein does not necessarily refer to a different embodiment. It is intended, for example, that claimed subject matter include combinations of any of some embodiments described herein in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are non-limiting examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. The wearables described herein comprise such networks, which include wireless networks according to some embodiments.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

One or more computers described herein according to some embodiments may be capable of (i.e., configured to) sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a (remote) computer capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart ring, smart watch, an integrated or distributed device combining various features, such as features of the forgoing devices, or the like.

Certain embodiments and principles will be discussed in more detail with reference to the figures. According to some embodiments, the disclosed subject matter may be described herein as directed to a wearable device in the form of a smart ring; however, it should not be construed as limiting, as any type of known or to be known smart device can be utilized via the disclosed functionality without departing from the scope of the instant disclosure.

With reference to FIG. 1, system 100 is depicted which includes user equipment (UE) 102, network 104, cloud system 106, database 108, and authentication engine 200. It is understood that while system 100 is depicted as including such components, it should not be construed as limiting, as one of ordinary skill in the art would readily understand that varying numbers of UEs 102 (e.g., the wearable device described herein), AP devices, peripheral devices, cloud systems, databases and networks can be utilized; however, for purposes of explanation, system 100 is discussed in relation to the example depiction in FIG. 1.

According to some embodiments, UE 102 is configured to interface with any type of device, such as, but not limited to, a mobile phone, tablet, laptop, sensor, Internet of Things (IoT) device, autonomous machine, and any other device equipped with a cellular or wireless or wired transceiver. For example, UE 102 can be a wearable device such as a smart ring, which as discussed below in more detail, can enable the identification and/or collection of vitals of the wearing user, which include vein patterns in some embodiments. In some embodiments, such vitals can correspond to, but not be limited to, heart rate, heart rate variability (HRV), blood oxygen levels, blood pressure, hydration temperature, pulse and/or any other type of biometric for a person, or some combination thereof. In some embodiments, vitals include one or more images of structures below the skin (e.g., bone and/or veins).

In some embodiments, peripheral device (not shown) can be connected to UE 102, and can be any type of peripheral device, such as, but not limited to, a smart ring, smart watch, printer, speaker, sensor, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via authentication engine 200) the authentication management and control discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, the services and applications provided by cloud system 106, and/or authentication engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
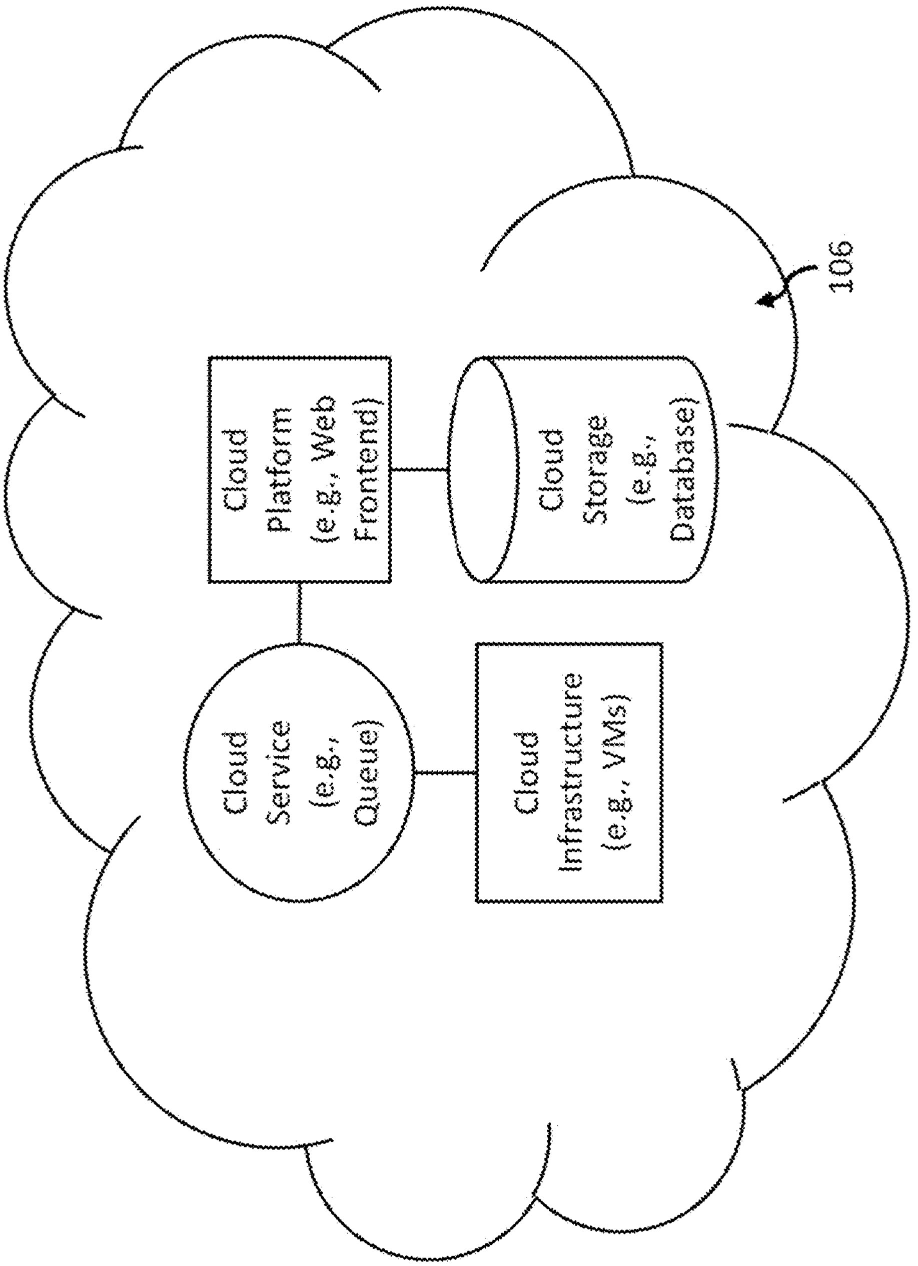
FIG. 5 depicts an example cloud system architecture according to some embodiments of the present disclosure.
Figure 6:
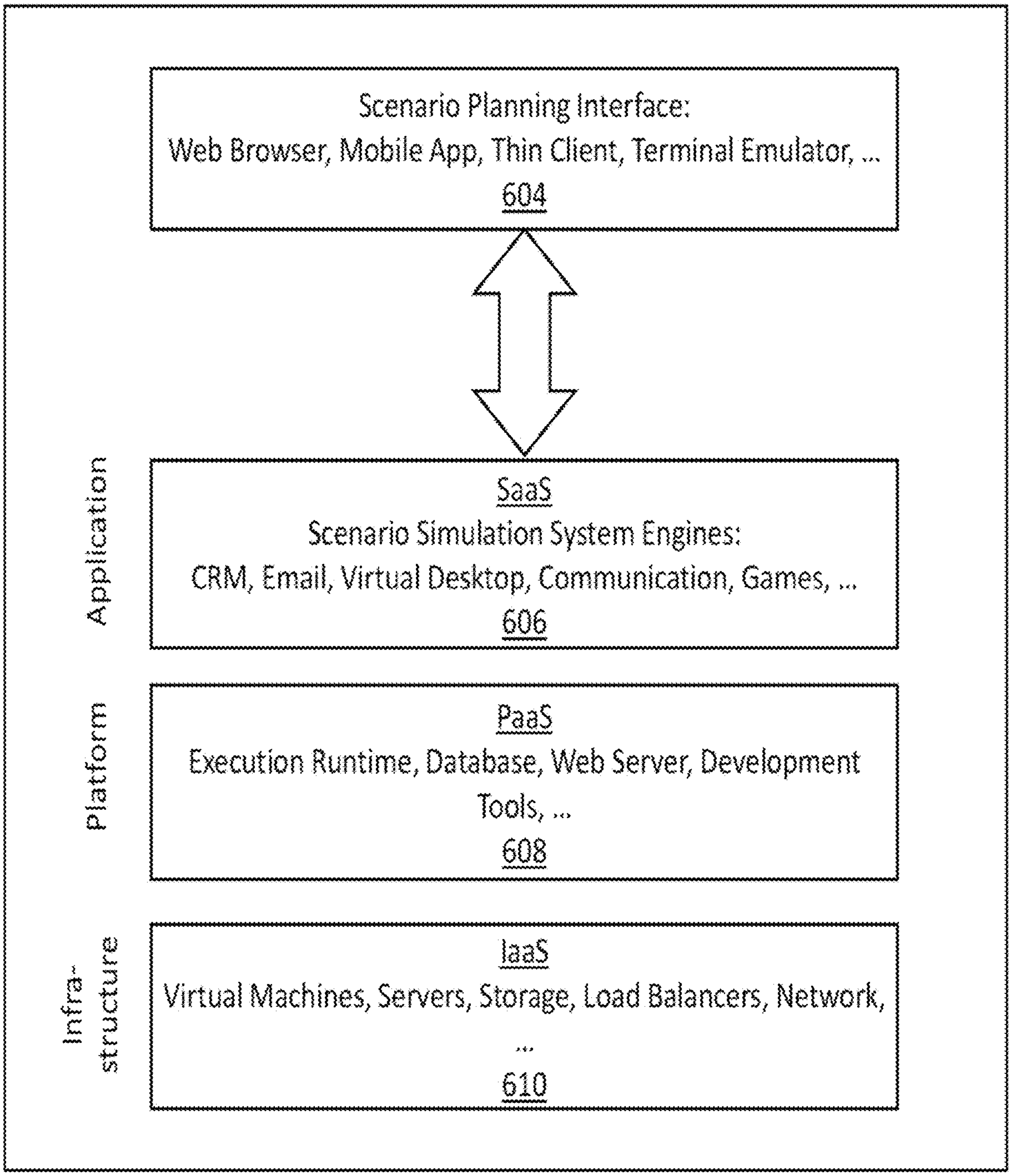
FIG. 6 depicts an example computer architecture according to some embodiments of the present disclosure.

Turning to FIGS. 5 and 6, in some embodiments, the example computer-based systems/platforms, the example computer-based devices, and/or the example computer-based components of the present disclosure may be specifically configured to operate in a cloud computing/architecture 120 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of non-limiting implementations of the cloud computing/architecture(s) in which the example computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Authentication engine 200, as discussed above and further below in more detail, can include components for the disclosed functionality. According to some embodiments, authentication engine 200 may include a special purpose machine or processor, and can be hosted by a device on network 104, within cloud system 106 and/or on UE 102. In some embodiments, engine 200 may be hosted by a server and/or set of servers associated with cloud system 106.

According to some embodiments, as discussed in more detail below, authentication engine 200 may be configured to implement and/or control a plurality of services and/or microservices, where each of the plurality of services/microservices are configured to execute a plurality of workflows associated with performing the disclosed authentication. Non-limiting embodiments of such workflows are provided below.

According to some embodiments, as discussed above, authentication engine 200 may implement an application provided by cloud system 106. In some embodiments, engine 200 may implement an application installed on UE 102, on a server(s), through network location and/or other type of network resource associated with system 106. In some embodiments, such application may be a web-based application accessed by UE 102 and/or devices associated cloud system 106. In some embodiments, authentication engine 200 may be configured and/or installed as an augmenting script, program or application (e.g., a plug-in or extension) to another application or program provided by cloud system 106 and/or UE 102.

Figure 2:
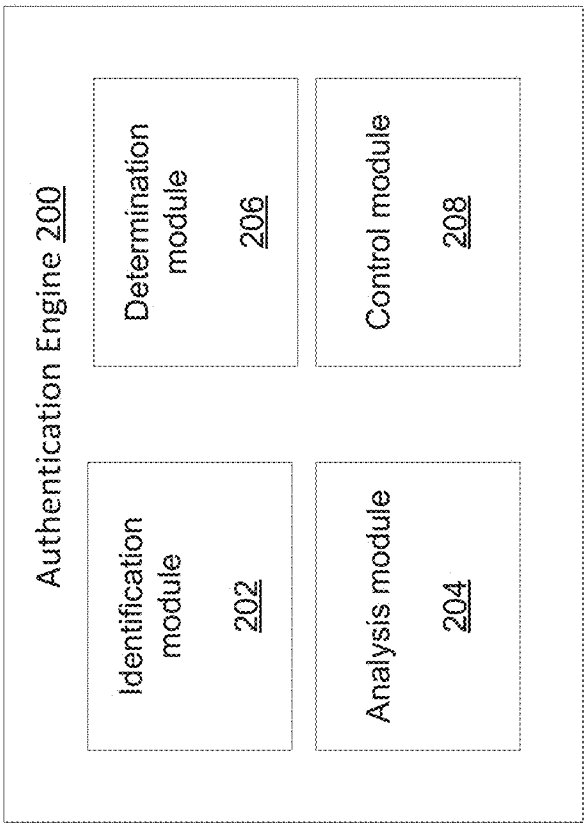
FIG. 2 is a block diagram illustrating components of an example system according to some embodiments of the present disclosure.

As illustrated in FIG. 2, according to some embodiments, authentication engine 200 includes identification module 202, analysis module 204, determination module 206, and control module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of authentication engine 200 and each of its modules, and their role within embodiments of the present disclosure will be discussed below.

Figure 3:
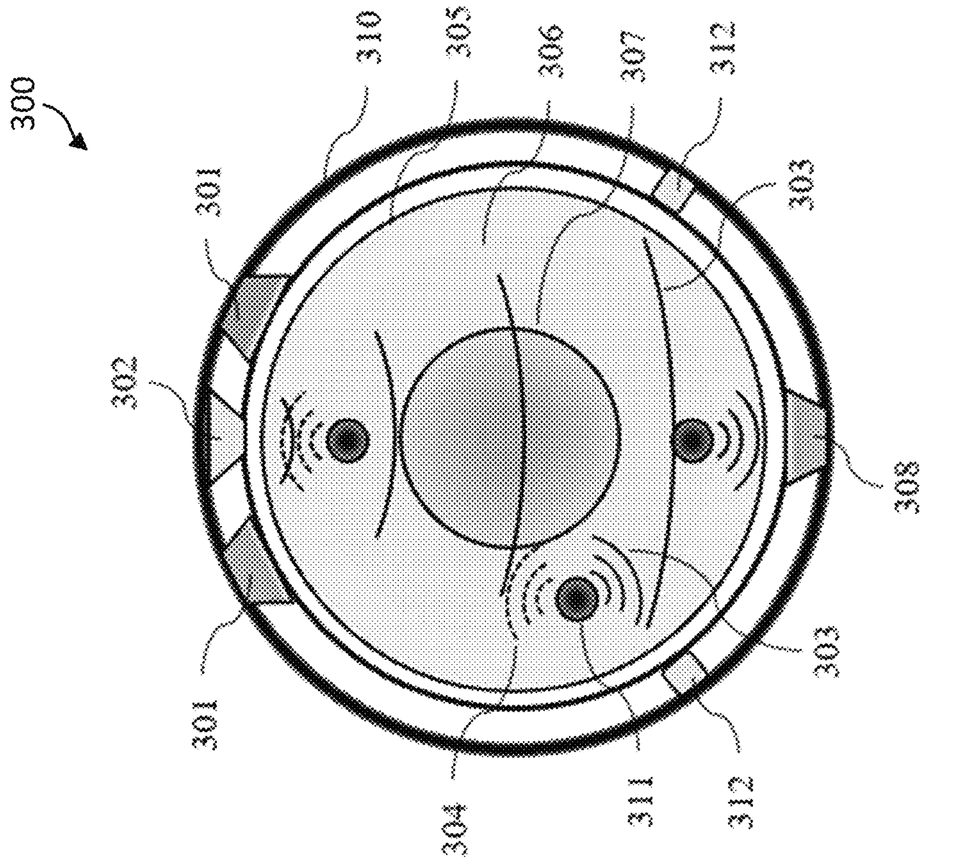
FIG. 3 illustrates an example system architecture according to some embodiments of the present disclosure.

Turning to FIG. 3, depicted is an example smart ring 300 which can be utilized for the authentication operations and capabilities discussed herein, and in more detail below. In some embodiments, the smart ring 300 can include one or more adjacent cameras 301 that are proximate to at least one light transmitter, which in such non-limiting example, can include, for example, LED transmitter 302. In some embodiments, the LED transmitter 302 is configured to produce light at the near-infrared wavelength, which can produce optimum results as the hemoglobin in blood absorbs the near-infrared light. For example, the LED transmitter 302 can cause absorption that enables a user's vein network within their finger(s) (or hand) 311 to appear as darker and/or as shaded patterns of lines as compared to the other portions of the finger, such as finger skin 305, finger flesh 306, and/or finger bone 307. In some embodiments, the one or more adjacent cameras 301 can be positioned to receive reflected light 304, which light directed in an at least partially opposite direction than the LED transmitter 302 is transmitting.

In some embodiments, for example, the one or more adjacent cameras 301 can be positioned up to a predetermined degree (e.g., 90 degrees) from the LED transmitter 302, relative to a center of the ring, and still receive reflected light. In some embodiments, one or more opposite cameras 308 can be configured to receive transmitted light 303 that can be traveling in an at least partial same direction as transmitted by LED transmitter 302. For example, the one or more opposite cameras 308 can be greater than 90 degrees (e.g., 180 degrees in this non-limiting example) from the LED transmitter 302, which can be relative to a center of the ring, and configured to receive light that has a direction component that matches the light transmission.

In some embodiments, one or more adjacent cameras 301, the one or more opposite cameras 308, and/or the (one or more) LED transmitter 302 are mechanically coupled to the ring 300 and may be secured in position by such non-limiting structures as the ring bezel 309 and/or ring cover 310. As discussed herein, this can enable smart ring 300 to determine, identify, and/or construct an accurate vein pattern model for a user. In some embodiments, the vein pattern model includes an RF model.

In some embodiments, the wearable device may include one or more auxiliary sensors 312. Non-limiting example auxiliary sensors 312 include, but are not limited to, one or more gyroscopes, accelerometers, temperature sensors, and/or photoplethysmography (PPG) sensors. Accordingly, in some embodiments, a user's vitals obtained from auxiliary sensors 312 can include heart rate, HRV, blood pressure, and/or blood oxygen level information, for example.

Figure 4:
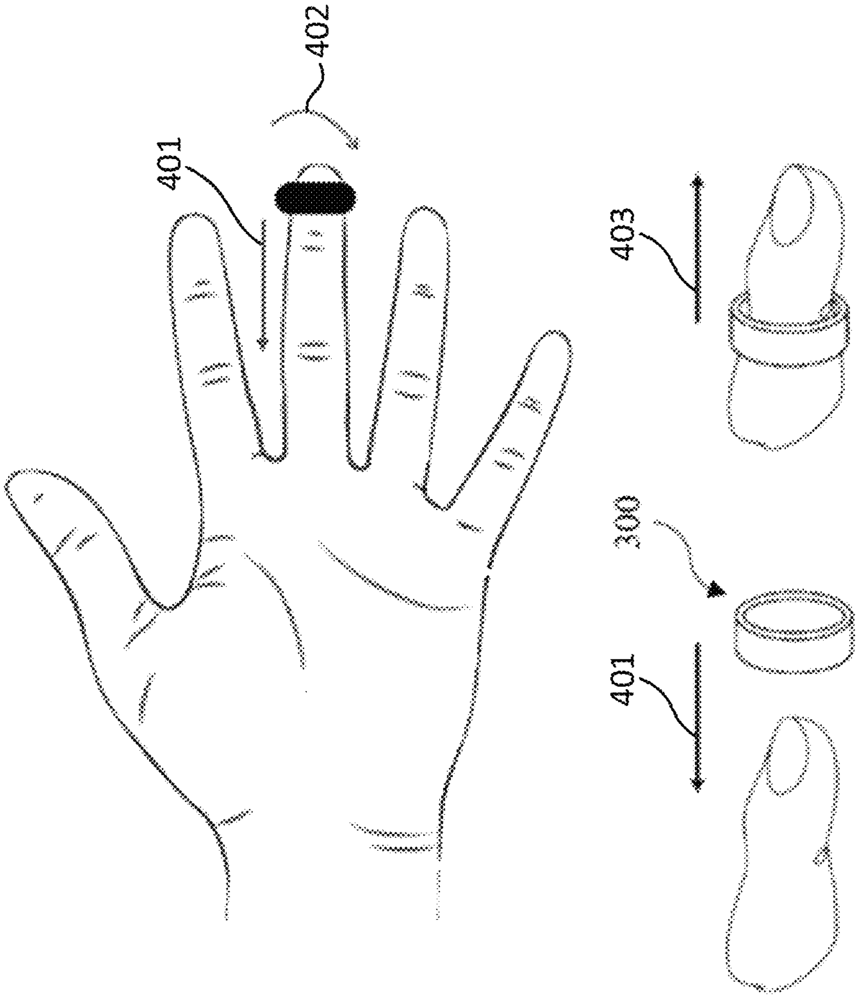
FIG. 4 illustrates an example implementation process according to some embodiments of the present disclosure.

FIG. 4 illustrates a non-limiting example implementation of smart ring [300] 400 according to some embodiments of the instant disclosure.

According to some embodiments, smart ring 400 can be configured to scan for vein patterns while being placed onto a finger in a generally linear direction 401 and/or a rotational direction 402. For example, as the smart ring 400 is placed onto a user's finger, the smart ring 300 moves from the distal end of the finger to the proximal end, which can include some degree of rotation 402, whereby, as discussed in detail below, engine 200 can cause the components of smart ring 400 (as discussed supra respective to FIG. 3 in relation to smart ring 300) to collect and analyze vein information of the user's finger so as to create a vein model that can be leveraged to securely authenticate the user's identity.

In some embodiments, smart ring 400 can be configured to record the results of a scan that has both a linear and rotational component. This allows the system to obtain vein patterns from various angles so that the user does not have to put the ring on the same way each time. As provided below, such scanning can be continuously and/or intermittently (e.g., according to a predetermined time period/interval) In some embodiments, smart ring 400 can also be configured to scan when the ring is being removed in a direction 403 (e.g., from the proximal end of the finger to the distal end—for example, taking off the ring). In some embodiments, smart ring 400 can be configured to halt/stop or pause scanning and/or lock once no veins are detected.

Figure 7:
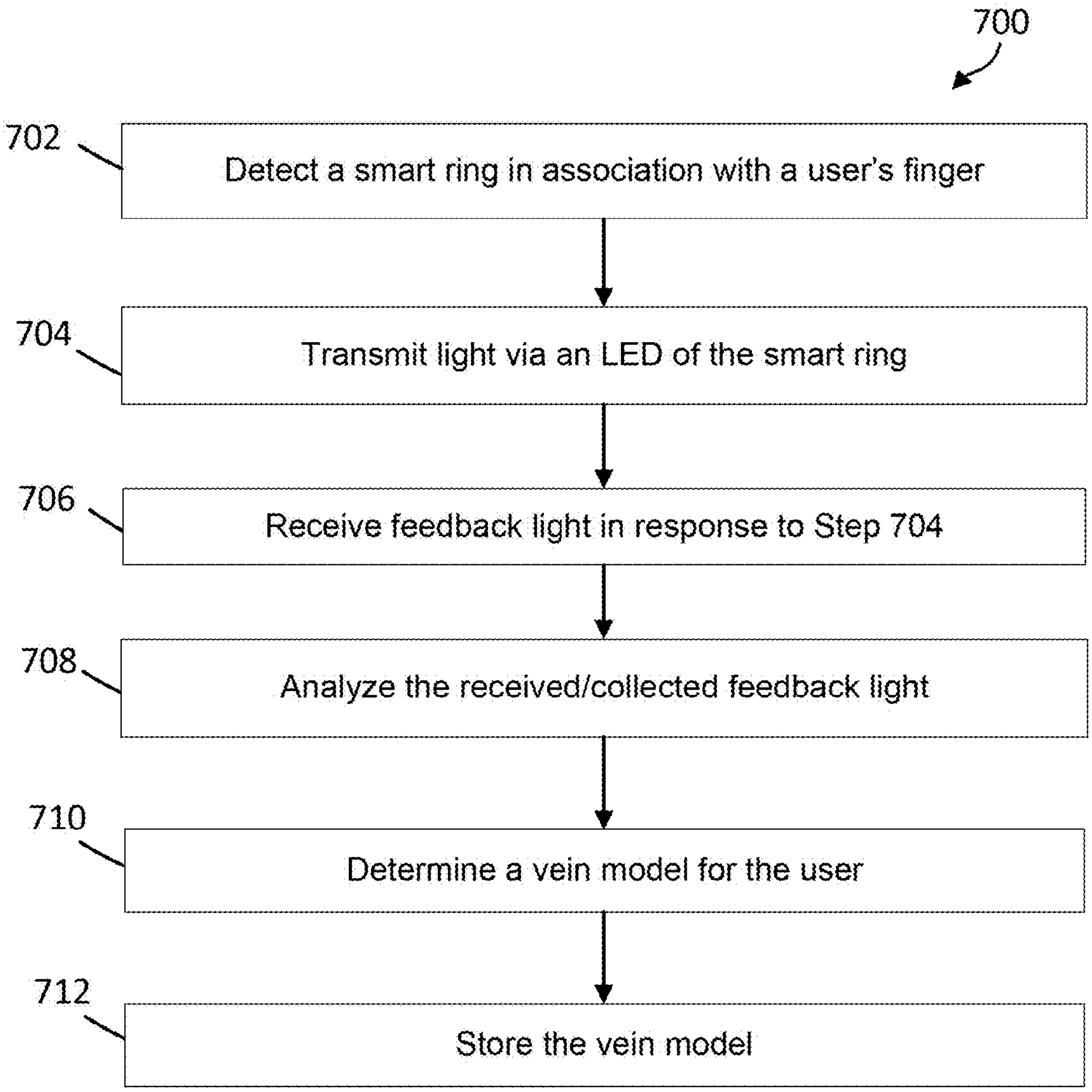
FIG. 7 illustrates a non-limiting embodiment of a workflow according to some embodiments of the present disclosure.

Turning to FIG. 7, depicted is Process 700 which details the computational analysis performed via engine 200 for a smart ring to collect vein data about a user, and build a vein model based on vein information specific to that user. As provided in FIG. 8 infra, Process 800 can leverage such vein model to determine a user's identity prior to performance of a real-world and/or digital activity.

According to some embodiments, Step 702 of Process 700 can be performed by identification module 202 of authentication engine 200; Steps 704-706 can be performed by analysis module 204; and Steps 708-712 can be performed by determination module 206.

According to some embodiments, Process 700 can begin with Step 702 where a user places (or begins to place) the smart ring 300 on a finger. According to some embodiments, in relation to Step 702, engine 200 can activate and/or identify one or more sensors to determine if and/or how the ring is being placed onto a finger (or the finger being inserted into the ring, for example).

According to some embodiments, for example, camera 301 of smart ring 300, as discussed supra, can detect a change in ambient lighting from the skin 305 covering the camera lens. In some embodiments, rotation 402 in conjunction with movement direction 401 as measured by an accelerometer can indicate the ring is being donned. In some embodiments, a combination of motion and camera images are used to initiate the authentication routine by the authentication engine 200.

At Step 704, engine 200 can communicate or transmit an initiation signal to the LED 302 causing light to be transmitted into the finger. As discussed above, while FIG. 3 only depicts a single LED light, it should be understood that multiple light sources and/or pulses/outputs can be utilized. In some embodiments, such light sources may produce different wavelengths, and/or may be different intensities based on the type of wearable device, the quality of a received image and/or location of the light source. In some embodiments, transmitted light can be absorbed differently by different structures in the finger. In some embodiments, where near-infrared light is transmitted by the LED 302, the blood absorbs a large amount of the light as compared to other finger structures. Since vein comprise a large concentration of blood, the vein appears darker than surrounding structures.

In Step 706, one or more cameras of smart ring 300 can receive the light that has been transmitted by LED 302. The near-infrared light transmitted by the LED can be absorbed by the blood as previously described, so concentrated areas of blood absorb more of the transmitted light than the flesh 306 or bone 307, for example. In some embodiments, the cameras can be embodied as near-infrared cameras; however it should not be construed as limiting to light producing/receiving devices, as any type of known or to be known device that can define internal structures (e.g., an ultrasound, MRI, CT, for example) can be utilized via the disclosed systems and methods without departing from the instant disclosure.

In Step 708, engine 200 can analyze the received light into vein information for the user and/or the user's finger. In some embodiments, the vein information can be structured as a set of images, a three-dimensional (3D) model, extended image, a data structure including vein data and metadata related to the captured vein information, and the like, or some combination thereof.

According to some embodiments, Step 708 can include engine 200 performing a computational analysis to compile the received light data so as to determine the vein information. According to some embodiments, such computational analysis can be performed via any type of known or to be known computational analysis technique, algorithm or technology. In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like.

According to some embodiments, the AI/ML computational analysis algorithms implemented can be applied and/or executed in a time-based manner, in that collected sensor data for specific time periods can be allocated to such time periods so as to determine patterns of activity (or non-activity) according to a criteria.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
c. apply the trained model to process the newly-received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Accordingly, based on the analysis in Step 708, in Step 710, engine 200 can determine the vein information. According to some embodiments, the vein information, which can be formatted and/or configured as a vein model for the user (and/or the user's specific finger) can include, but not be limited to, a number of veins, size of veins, length of veins, vein position, blood circulation through the veins (e.g., for a predetermined period of time), and the like, or some combination thereof. Moreover, such vein information/model can provide indicators as to vitals represented by data associated with the veins—for example, And, in Step 712, engine 200 can store the vein model. In some embodiments, such storage can occur respective to database 108 and/or the smart ring (e.g., UE 102), as discussed above.

Figure 8:
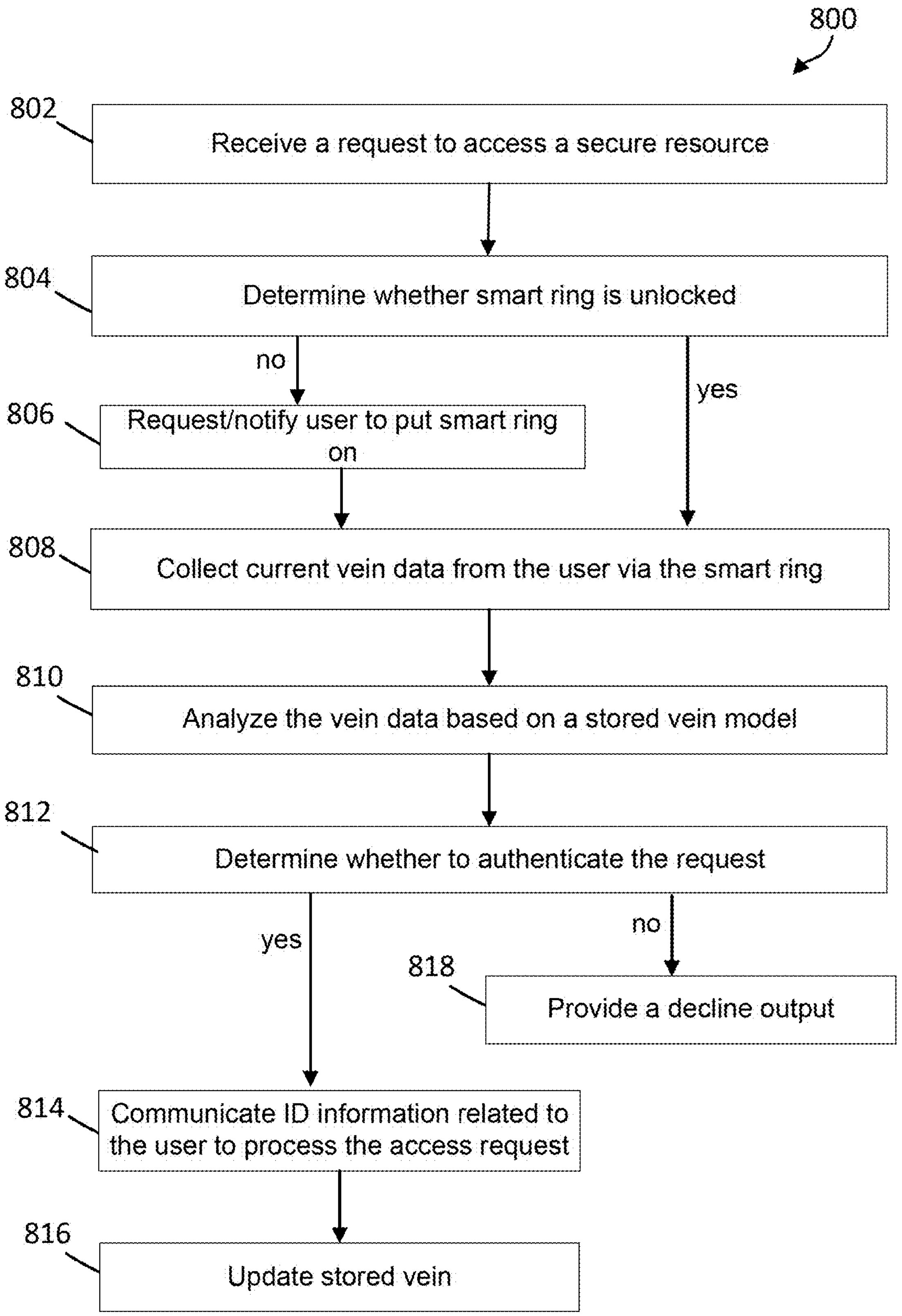
FIG. 8 illustrates a non-limiting workflow according to some embodiments of the present disclosure.

Turning to FIG. 8, discussed herein is Process 800, which details non-limiting example embodiments for leveraging the known vein pattern for a user to authenticate the user and unlock the requested device.

According to some embodiments, Steps 802 and 806 of Process 800 can be performed by identification module 202 of authentication engine 200; Steps 804 and 812 can be performed by determination module; Steps 808-810 can be performed by analysis module 204; and Steps 814-818 can be performed by control module 208.

According to some embodiments, Process 800 can begin with Step 802 where a user provides a request to access a secure resource. In some embodiments, as discussed above, the secure resource can be related to an electronically hosted location, a local location, and can be an electronic asset, digital asset and/or real world asset. For example, the request for access can correspond to an access point (AP)

device, for which access to an account of the AP device may be granted via the user's smart ring, as discussed herein. In another example, a user may be requesting access to a web portal, bank account, web site, application, another device, and the like, for which the smart ring protocols discussed herein can be utilized to confirm the user's identity.

In Step 804, in response to the request, engine 200 can determine whether the user's smart ring is locked. That is, as discussed above, if the smart ring is locked, then the ring is either not currently being worn, is on a wrong finger, or is not correctly being worn otherwise (according to a known vein model of the user, which can be determined in a similar manner as discussed below re: Steps 810-812).

In some embodiments, when the smart ring is determined to be locked, processing can proceed to Step 806, where a request or notification can be sent to the user to put their smart ring on (as discussed above at least in relation to FIG. 4). In some embodiments, the notification can be sent to the smart ring or other connected, coupled or user-related UE, which can cause an indication regarding the need to put on the user's ring—for example, an audible, haptic, visible and the like output.

In Step 808, upon determination that the user's smart ring is being properly worn, engine 200 can collect vein (or biometric) data via the smart ring. Such vein data collection can be performed in a similar manner as discussed above at least with respect to FIGS. 3, 4 and 7. In some embodiments, such collection can be performed according to a predetermined time period or interval, which can be tied to how the smart ring captures vein readings/data from the user, as discussed supra.

In Step 810, engine 200 can analyze the collected vein data based on a stored vein model for the user. Thus, in Step 810, engine 200 can retrieve the vein model for the user from storage (as discussed above respective to Step 712, supra), and then perform a comparison to the collected vein data. In some embodiments, the analysis performed in Step 810 can involve an AI/ML-based computational analysis that can be performed in a similar manner as discussed above at least in relation to Step 708.

In Step 812, based on the analysis in Step 810, engine 200 can determine whether to authenticate the user for access to the secure resource. In some embodiments, Step 812 can involve determining whether the vein data matches at least to a threshold similarity value to the information provided in the vein data, which can be performed via the analysis processing discussed above in Step 810.

In some embodiments, when a match of the vein data is not determined, processing can proceed to Step 818 where the request is declined. In some embodiments, an output can be provided to indicate the decline. In some embodiments. Step 818 can involve engine 200 outputting a "null" or "decline" message to the secure resource indicating that information communicated for the smart ring should be disregarded, ignored or quarantined as the user is not a valid user.

In some embodiments, when Step 812 determines that a match between the vein data and the vein model is present, the processing can proceed to Step 814, whereby engine 200 can cause the smart ring to communication information related to an identifier (ID) of the user to the secure resource. This can serve as login information that the secure resource can utilize to confirm the user's identity and enable the requested access. In some embodiments, such communicated ID information can be encrypted and/or be subject to a time-to-live (TTL) protocol.

And, in Step 816, engine 200 can update the stored vein model with the collected vein data so as to ensure the vein model for the user is up to date with the most current vein data, whereby a refined model can ensure accurate identity authentication for future authentication requests.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, example software specifically programmed in accordance with one or more principles of the present disclosure may be downloadable from a network, for example, a website, as a stand-alone product or as an add-in package for installation in an existing software application. For example, example software specifically programmed in accordance with one or more principles of the present disclosure may also be available as a client-server software application, or as a web-enabled software application. For example, example software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing example embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

receiving, over a wireless network, a request from a user for access to a secure resource;

collecting, for a time period, biometric data for the user via a smart device associated with the user, the smart device comprising a light emitting diode (LED) transmitter, one or more adjacent cameras, and one or more opposite cameras, the biometric data being collected by the smart device and contained within images depicting a vein structure associated with the user, wherein collecting comprises, while the smart device is being placed onto a finger in a generally linear direction and a rotational direction and recording the results of a scan that has both a linear and rotational component, transmitting, via the LED transmitter, light at the near-infrared wavelength into the finger, receiving reflected light via the one or more adjacent cameras and receiving transmitted light via the one or more opposite cameras to capture the images, and halting or pausing scanning and locking once the captured images no longer depict the vein structure associated with the user;

analyzing, via execution of a computational analysis application, the biometric data based on a vein model of the user, the vein model comprising information related to known vein patterns of the user;

determining, based on the analysis, to authenticate the request, the determination being based on a computational similarity between the biometric data and the vein model;

communicating, over the wireless network, via the smart device, identifier (ID) information related to the user to the secure resource, the communication comprising applying, via the smart device, at least one of encryption or a time-to-live to the ID information, the communicated ID information causing the access request to be granted by the secure resource;

updating, based on the biometric data, the vein model; and storing the updated vein model.

2. The method of claim 1, wherein the biometric data corresponds to vein information comprising information related to at least one of a number of veins, size of veins, length of veins, vein position, and blood circulation through the veins.

3. The method of claim 1, wherein the biometric data corresponds to information related to at least one of heart rate, heart rate variability (HRV), blood oxygen levels, blood pressure, hydration temperature, and pulse.

4. The method of claim 1, further comprising:

identifying a set of sensors associated with the smart device;

collecting data from each of the set of sensors;

analyzing, via the computational analysis application, the collected sensor data;

determining, via the computational analysis application, the vein model for the user; and storing the vein model in a location accessible by the smart device.

5. The method of claim 1, wherein the smart device is user equipment.

6. The method of claim 1, wherein the secure resource is at least one of a digital asset, electronic asset and real-world asset.

7. A device comprising:

a processor configured to:

receive, over a wireless network, a request from a user for access to a secure resource;

collect, for a time period, biometric data for the user via a smart device associated with the user, the smart device comprising a light emitting diode (LED)

transmitter, one or more adjacent cameras, and one or more opposite cameras, the biometric data being collected by the smart device and contained within images depicting a vein structure associated with the user, wherein collecting comprises, while the smart device is being placed onto a finger in a generally linear direction and a rotational direction and recording the results of a scan that has both a linear and rotational component, transmitting, via the LED transmitter, light at the near-infrared wavelength into the finger, receiving reflected light via the one or more adjacent cameras and receiving transmitted light via the one or more opposite cameras to capture the images, and halting or pausing scanning and locking once the captured images no longer depict the vein structure associated with the user;

analyze, via execution of a computational analysis application, the biometric data based on a vein model of the user, the vein model comprising information related to known vein patterns of the user;

determine, based on the analysis, to authenticate the request, the determination being based on a computational similarity between the biometric data and the vein model;

communicate, over the wireless network, via the smart device, identifier (ID) information related to the user to the secure resource, the communication comprising applying, via the smart device, at least one of encryption or a time-to-live to the ID information, the communicated ID information causing the access request to be granted by the secure resource;

update, based on the biometric data, the vein model; and store the updated vein model.

8. The device of claim 7, wherein the biometric data corresponds to vein information comprising information related to at least one of a number of veins, size of veins, length of veins, vein position, and blood circulation through the veins.

9. The device of claim 7, wherein the processor is further configured to:

identify a set of sensors associated with the smart device;

collect data from each of the set of sensors;

analyze, via the computational analysis application, the collected sensor data;

determine, via the computational analysis application, the vein model for the user; and store the vein model in a location accessible by the smart device.

10. A non-transitory computer-readable storage medium tangibly encoded with computer-executable instructions, that when executed by a processor of a device, perform a method comprising:

receiving, over a wireless network, a request from a user for access to a secure resource;

collecting, for a time period, biometric data for the user via a smart device associated with the user, the smart device comprising a light emitting diode (LED) transmitter, one or more adjacent cameras, and one or more opposite cameras, the biometric data being collected by the smart device and contained within images depicting a vein structure associated with the user, wherein collecting comprises, while the smart device is being placed onto a finger in a generally linear direction and a rotational direction and recording the results of a scan that has both a linear and rotational component, transmitting, via the LED transmitter, light at the near-infrared wavelength into the finger, receiving reflected light via the one or more adjacent cameras and receiving transmitted light via the one or more opposite cameras to capture the images, and halting or pausing scanning and locking once the captured images no longer depict the vein structure associated with the user;

analyzing, via execution of a computational analysis application, the biometric data based on a vein model of the user, the vein model comprising information related to known vein patterns of the user;

determining, based on the analysis, to authenticate the request, the determination being based on a computational similarity between the biometric data and the vein model;

communicating, over the wireless network, via the smart device, identifier (ID) information related to the user to the secure resource, the communication comprising applying, via the smart device, at least one of encryption or a time-to-live to the ID information, the communicated ID information causing the access request to be granted by the secure resource;

updating, based on the biometric data, the vein model; and storing the updated vein model.

11. The non-transitory computer-readable storage medium of claim 10, wherein the biometric data corresponds to vein information comprising information related to at least one of a number of veins, size of veins, length of veins, vein position, and blood circulation through the veins.

12. The non-transitory computer-readable storage medium of claim 10, further comprising:

identifying a set of sensors associated with the smart device;

collecting data from each of the set of sensors;

analyzing, via the computational analysis application, the collected sensor data;

determining, via the computational analysis application, the vein model for the user; and storing the vein model in a location accessible by the smart device.

* * * * *